(12) United States Patent
Kuik et al.

(10) Patent No.: US 6,842,841 B1
(45) Date of Patent: Jan. 11, 2005

(54) METHOD AND SYSTEM FOR DYNAMICALLY SELECTING TAPE DRIVES TO CONNECT WITH HOST COMPUTERS

(75) Inventors: Timothy John Kuik, Lino Lakes, MN (US); Renae M. Weber, Minneapolis, MN (US); Mark A. Bakke, Maple Grove, MN (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/400,500

(22) Filed: Sep. 21, 1999

(51) Int. Cl.[7] ............................................. G06F 12/00
(52) U.S. Cl. ............................ 711/203; 711/111; 711/4; 369/30.38
(58) Field of Search ............................ 711/4, 111, 112, 711/114, 200, 202, 203; 700/214; 360/91; 369/30.01, 30.38, 30.39, 30.4, 30.41, 30.46, 30.48, 30.54, 34.01

(56) References Cited

U.S. PATENT DOCUMENTS

| | | |
|---|---|---|
| 4,945,429 A | 7/1990 | Munro et al. |
| 5,214,768 A | 5/1993 | Martin et al. |
| 5,303,214 A | 4/1994 | Kulakowski et al. |
| 5,388,260 A | 2/1995 | Monahan et al. |
| 5,412,791 A | 5/1995 | Martin et al. |
| 5,430,855 A | 7/1995 | Walsh et al. |
| 5,475,817 A | 12/1995 | Waldo et al. |
| 5,504,873 A | 4/1996 | Martin et al. |

(List continued on next page.)

FOREIGN PATENT DOCUMENTS

| | | | |
|---|---|---|---|
| EP | 0 535 922 | 4/1993 | |
| EP | 0 887 751 A2 * | 8/1998 | ............ G06F/17/30 |
| EP | WO 02/27463 A2 * | 4/2002 | ............ G06F/03/06 |
| JP | 07084839 A * | 3/1995 | ............ G06F/12/00 |
| WO | 98 33113 | 7/1998 | |
| WO | WO 98/40810 | 9/1998 | |
| WO | WO 00/04454 | 1/2000 | |

OTHER PUBLICATIONS

J.L. Sloan et al.,"Massive™: The Mass Storage System IV Enterprise" Proceedings of the IEEE, vol. 81, No. 4, Apr. 1993, pp. 621–630.

S. Coleman et al. "Mass Storage System Reference Model" Version 4 Published by the IEEE Technical Committee on Mass Storage Systems and Technology, May 1990, pp. 1–39.

Jander, M. "Launching Storage–Area Net", Data Communications, US, McGraw Hill, New York, vol. 27, No. 4, Mar. 21, 1998, pp. 64–72.

Christensen, B. "Building a Storage–Area Network–SANS Boost Performance, Reliability and Scalability of the Critical Link Between Servers and Storage Devices," Data Communications, US, McGraw Hill, New York, vol. 27, No. 6, Apr. 21, 1998, pp. 67–70 & 74.

*Primary Examiner*—Pierre Bataille
(74) *Attorney, Agent, or Firm*—Brooks Kushman P.C.

(57) ABSTRACT

A method and system for connecting a host to a tape drive for accessing a tape cartridge in a data storage system having a tape library provided with cartridges and tape drives includes the host requesting a desired cartridge to access. In response to the request, a proxy agent queries the library to determine which of the tape drives are available to receive the desired cartridge. The proxy agent then selects a tape drive from the available tape drives to receive the desired cartridge. The desired cartridge is then mounted into the selected tape drive. An access controller then connects a virtual tape drive associated with the host to the selected tape drive to provide the host with access to the desired cartridge. The selected tape drive may be selected as a function of its location with respect to the storage location of the desired cartridge. While the host computer is accessing the desired cartridge, the access controller may simultaneously connect another virtual tape drive associated with a second host to another tape drive to provide the second host with access to a different cartridge.

19 Claims, 2 Drawing Sheets

U.S. PATENT DOCUMENTS

| | | | | |
|---|---|---|---|---|
| 5,506,986 A | | 4/1996 | Healy | |
| 5,522,090 A | * | 5/1996 | Tanaka et al. | 711/165 |
| 5,535,322 A | | 7/1996 | Hecht | |
| 5,537,585 A | | 7/1996 | Blickenstaff et al. | |
| 5,546,557 A | | 8/1996 | Allen et al. | |
| 5,560,040 A | | 9/1996 | Mizumachi | 710/1 |
| 5,566,331 A | | 10/1996 | Irwin, Jr. et al. | |
| 5,613,154 A | | 3/1997 | Burke et al. | |
| 5,630,067 A | | 5/1997 | Kindell et al. | |
| 5,640,510 A | | 6/1997 | Hanaoka et al. | 714/42 |
| 5,664,186 A | | 9/1997 | Bennett et al. | |
| 5,671,439 A | | 9/1997 | Klein et al. | |
| 5,689,481 A | | 11/1997 | Tamura et al. | |
| 5,694,550 A | | 12/1997 | Takeda et al. | |
| 5,710,549 A | | 1/1998 | Horst et al. | |
| 5,740,362 A | | 4/1998 | Buickel et al. | |
| 5,751,715 A | | 5/1998 | Chan et al. | |
| 5,758,050 A | | 5/1998 | Brady et al. | |
| 5,758,085 A | | 5/1998 | Kouoheris et al. | |
| 5,758,125 A | | 5/1998 | Misinai et al. | |
| 5,802,258 A | | 9/1998 | Chen | |
| 5,805,864 A | * | 9/1998 | Carlson et al. | 360/132 |
| 5,809,285 A | | 9/1998 | Hilland | |
| 5,828,836 A | | 10/1998 | Westwick et al. | |
| 5,829,053 A | | 10/1998 | Smith et al. | |
| 5,832,527 A | | 11/1998 | Kawaguchi | |
| 5,838,891 A | | 11/1998 | Mizuno et al. | |
| 5,881,311 A | | 3/1999 | Woods | |
| 5,884,046 A | | 3/1999 | Antonov | |
| 5,890,203 A | | 3/1999 | Aoki | |
| 5,941,972 A | | 8/1999 | Hoese et al. | |
| 5,946,685 A | * | 8/1999 | Cramer et al. | 707/10 |
| 5,963,971 A | | 10/1999 | Fosler et al. | |
| 6,029,230 A | * | 2/2000 | Ng | 711/159 |
| 6,044,442 A | | 3/2000 | Jesionowski | |
| 6,052,341 A | * | 4/2000 | Bingham et al. | 700/214 |
| 6,067,481 A | | 5/2000 | Saliba et al. | |
| 6,094,605 A | * | 7/2000 | Blendermann et al. | 700/214 |
| 6,247,096 B1 | | 6/2001 | Fisher et al. | |
| 6,260,006 B1 | | 7/2001 | Wong et al. | |
| 6,336,163 B1 | * | 1/2002 | Brewer et al. | 711/112 |
| 6,496,791 B1 | * | 12/2002 | Yates et al. | 711/111 |

* cited by examiner

METHOD AND SYSTEM FOR DYNAMICALLY SELECTING TAPE DRIVES TO CONNECT WITH HOST COMPUTERS

TECHNICAL FIELD

The present invention relates generally to data storage systems and, more particularly, to a method and system for dynamically selecting tape drives to connect with host computers.

BACKGROUND ART

A popular device for handling large amounts of information in a data storage system is the automated cartridge library. Automated cartridge libraries store and manage large numbers of tape cassettes containing magnetic tape on which is recorded data. Typically an automated cartridge library comprises a tape library having arrays of uniquely identified cells, each cell being formed to contain a single tape cartridge. A robot assembly is operable within the tape library to locate a particular cell, retrieve a tape cartridge from the particular cell, convey the tape cartridge to a tape drive, and insert the tape cartridge into the tape drive. The tape drive then reads or writes data to the magnetic tape of the tape cartridge. In this way, a large number of tape cartridges are automatically accessible to a single tape drive. The operation of the automated cartridge library and the tape drive is typically controlled by a host computer communicating with a library server associated with the tape library.

A plurality of host computers typically communicate with the library server to access tape cartridges stored in the tape library. The host computers access the tape cartridges via the tape drives to read files stored on the tape cartridges and to write files to the tape cartridges.

Each of the host computers are configured to be connected to respective sets of tape drives associated with the tape library. For instance, a first host computer is configured to be connected to a first set of tape drives and a second host computer is configured to be connected to a second set of tape drives. Generally, the tape drives overlap in different tape drive sets associated with respective the host computers and the tape drive sets are not mutually exclusive.

To access a desired file, a host computer sends a request to the library server to retrieve the tape cartridge on which the desired file is stored. In response, the library server directs the robot assembly of the tape library to retrieve the desired tape cartridge from the array of tape cartridges and then mount it into a tape drive of the tape drive set associated with the host computer making the request. If the desired file is stored on more than one tape cartridge, then the library server directs the robot assembly to retrieve all of the tape cartridges storing the desired file and mount them into the tape drives associated with the host computer.

A disadvantage associated with prior art data storage systems is that configuring many host computers to be connected to their respective tape drives is unwieldy when simultaneous access to many tape drives is desired. What is needed is a method and system for dynamically selecting tape drives to connect with host computers.

SUMMARY OF THE INVENTION

Accordingly, it is an object of the present invention to provide a method and system for connecting a host computer to a physical drive for accessing a storage unit in which the physical drive is dynamically selected from a plurality of physical drives.

It is another object of the present invention to provide a method and system for simultaneously connecting host computers to respective physical drives in which the respective physical drives are dynamically selected from a plurality of physical drives.

It is a further object of the present invention to provide a method and system for connecting a host computer to a tape drive for accessing a tape cartridge in which the tape drive is dynamically selected from all of the tape drives in a tape library.

It is still another object of the present invention to provide a method and system for connecting a host computer to a tape drive for accessing a tape cartridge in which a virtual tape drive associated with the host computer is connected to a tape drive dynamically selected from a plurality of tape drives.

It is still a further object of the present invention to provide a method and system for connecting a host computer to a tape drive for accessing a tape cartridge in which the tape drive is dynamically selected from a plurality of tape drives based on proximity information of the tape cartridge with respect to each one of the plurality of tape drives.

In carrying out the above objects and other objects, the present invention provides a method for connecting a host computer to a physical drive for accessing a storage unit. The method is for use in a data storage system having a library provided with a plurality of storage units, a plurality of physical drives for processing the storage units, and a library server for mounting the plurality of storage units into the plurality of physical drives. The storage units may be tape cartridges or disks and the physical drives may be either tape drives or disk drives.

The method includes selecting a desired storage unit stored in the library for a host computer to access. The library server is then requested for the host computer to have access to the desired storage unit. A physical drive is then selected from the plurality of physical drives to receive the desired storage unit. The desired storage unit is then mounted into the selected physical drive using the library server. A virtual drive associated with the host computer is then connected to the selected physical drive to provide the host computer with access to the desired storage unit.

Preferably, the method may further include determining proximity information of the desired storage unit with respect to each one of the plurality of physical drives. The physical drive is then selected from the plurality of physical drives based on the proximity information.

The method may also include predicting a storage unit stored in the library to be requested by the host computer to access and then mounting the predicted storage unit into a physical drive. The library server is then requested for the host computer to have access to the predicted storage unit after the predicted storage unit has been mounted into the physical device. The virtual drive is then connected to the physical drive having the predicted storage unit to provide the host computer with access to the predicted storage unit.

The method may further include selecting a second storage unit stored in the library for a second host computer to access and then requesting the library server for the second host computer to have access to the selected second storage unit. A second physical drive is then selected from the plurality of physical drives to receive the second storage unit. The second storage unit is then mounted into the selected second physical drive using the library server. A second virtual drive associated with the second host computer is then connected to the selected second physical drive to provide the second host computer with access to the second storage unit.

In carrying out the above objects and other objects, the present invention further provides a data storage system in accordance with the method of the present invention.

The advantages accruing to the present invention are numerous. For instance, host computer configuration is reduced and more easily managed. Adding new tape drives to the tape library will not require configuration updates to all of the attached host computers. Mount times are reduced by using the dynamically mapped scheme of the present invention because the proxy agent has all of the tape drives of the tape library to choose from. This increases the likelihood of the tape drive nearest the storage location of the desired tape cartridge being selected to mount the desired tape cartridge. Tape drive maintenance can also be performed without affecting a particular host computer because individual host computers are not tied to particular tape drives. Other potential optimizations can be performed as well. For example, scratch volumes can be pre-loaded in available tape drives so that when a mount scratch request is received, the tape drive can be made immediately available.

The above objects and other objects, features, and advantages of the present invention are readily apparent from the following detailed description of the best mode for carrying out the present invention when taken in connection with the accompanying drawings.

BEST MODES FOR CARRYING OUT THE INVENTION

Figure 1:
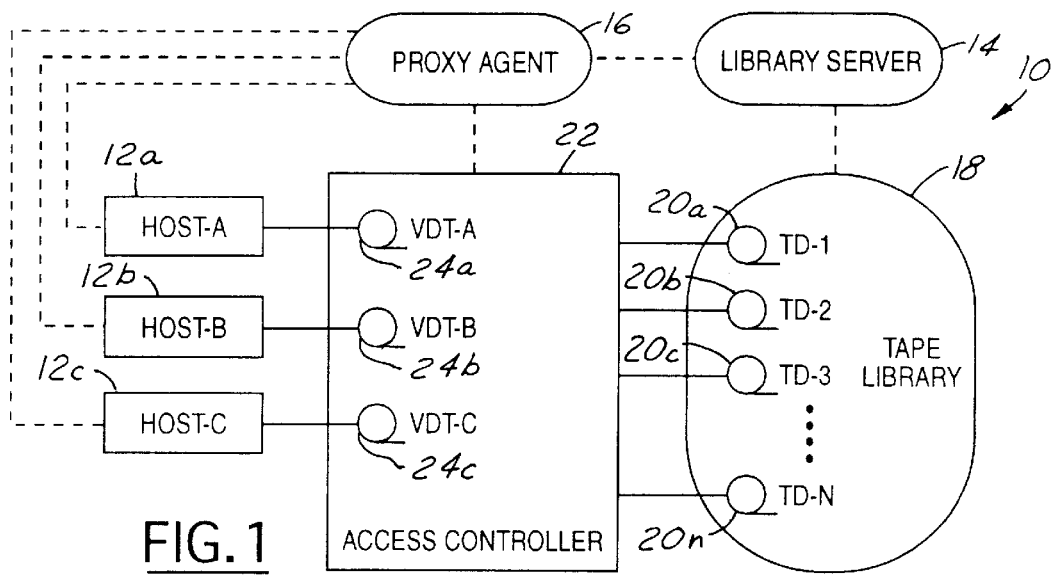
FIG. 1 illustrates an automated tape cartridge library system in accordance with the present invention.

Referring now to FIG. 1, an automated tape cartridge library system 10 in accordance with the present invention is illustrated. Host computers 12a, 12b, and 12c communicate with a library server 14 via a proxy agent 16. Library server 14 governs the operation of a robot assembly within a tape library 18. Tape library 18 includes a plurality of tape cartridges. The tape cartridges have recorded data or are available to record data. Tape library 18 further includes a plurality of tape drives (TD) 20(a–n). Tape drives 20 are used to write/read data from/to the tape cartridges. An access controller 22 connects host computers 12 to tape drives 20 for the host computers to access the tape cartridges.

Library server 14 interprets signals from host computers 12 and provides appropriate signals to the robot assembly within tape library 18 to control its motion and operation. Signals from host computer 12 control the handling and storage of tape cartridges within tape library 18. In response to the signals, the robot assembly retrieves tape cartridges and mounts them into tape drives 20 for processing by host computers 12. After processing, the robot assembly dismounts the tape cartridges from tape drives 20 and returns them to their appropriate storage area within tape library 18. Control signals between host computers 12 and library server 14 via proxy agent 16 are conducted over connections represented by dotted lines in FIG. 1. Each of host computers 12 communicates with proxy agent 16 through a respective connection.

Access controller 22 includes virtual tape drives (VTD) 24a, 24b, and 24c each associated with a respective one of host computers 12. For instance, virtual tape drive 24a is associated with host computer 12a and virtual tape drive 24b is associated with host computer 12b. Access controller 22 enables data paths between host computers 12 and tape drives 20 through virtual tape drives 24 for the host computers to process tape cartridges mounted in the tape drives.

For example, access controller 22 enables a data path between host computer 12a and tape drive 20b through virtual tape drive 24a. While access controller 22 enables this data path, host computer 12a can process a tape cartridge mounted within tape drive 20b. Access controller 22 can then disable the data path after processing. Access controller 22 then can enable, for example, a data path between host computer 12a and tape drive 20c through virtual tape drive 24a for host computer 12a to process a tape cartridge mounted in tape drive 20c. Similarly, access controller 22 enables a data path between host computer 12b and tape drive 20n through virtual tape drive 24b for host computer 12b to process a tape cartridge mounted within tape drive 20n. Access controller 22 creates virtual tape drives 24 to give the host computers 12 the perspective that they have their own dedicated tape drive and are not sharing tape drives with any of the other host computers.

Access controller 22 can enable a data path between any one of host computers 12 with tape drives 20 through virtual tape drives 24. Access controller 22 can simultaneously enable data paths between host computers 12 with tape drives 20 through virtual tape drives 24. For example, access controller 22 can simultaneously enable a first data path between host computer 12a with tape drive 20a through virtual tape drive 24a and enable a second data path between host computer 12b with tape drive 20n through virtual tape drive 24b. Proxy agent 16 is operable with access controller 22 to instruct the access controller to enable the data paths between host computers 12 and tape drives 20. Proxy agent 16 is also operable with library server 14 to select a tape drive from tape drives 20 for connection with one of host computers 12 via the associated virtual tape drive 24.

In operation, host computer 12a sends a control signal to library server 14 requesting the library server to retrieve a desired tape cartridge from tape library 18 and mount it into virtual tape drive 24a. Proxy agent 16 intercepts the control signal and queries library server 14 to generate a list of available tape drives that the desired tape cartridge could be mounted into. The availability of tape drives 20 depends on numerous factors such as whether the tape drives are currently loaded with other tape cartridges, whether the tape drives are disabled for maintenance, and the like. In addition to requesting library server 14 to determine which of tape drives 20 are available for mounting the desired tape cartridge, proxy agent 16 also queries library server 14 to generate proximity information of the location of the available tape drives with respect to the storage location of the desired tape cartridge.

Based on the list of available tape drives and the proximity information, proxy agent 16 selects a tape drive for processing the desired tape cartridge. Proxy agent 16, as an example, selects tape drive 20c as the selected tape drive. In response, library server 14 directs the robot assembly to retrieve the desired tape cartridge from its storage location and mount it into selected tape drive 20c. Proxy agent 16 then directs access controller 22 to enable the data path between host computer 12a and selected tape drive 20c via virtual tape drive 24a. Host computer 12a then has access to the desired tape cartridge mounted in selected tape drive 20c to process the desired tape cartridge.

After processing the desired tape cartridge, host computer 12a may then send a second control signal to library server 14 requesting the library server to retrieve a second desired tape cartridge from tape library 18 and mount it into virtual tape drive 24a. Proxy agent 16 intercepts the second control signal and directs library server 14 to disable the data path between host computer 12a and selected tape drive 20c via virtual tape drive 24a. Proxy agent 16 also queries library server 14 to generate a list of available tape drives that the second desired tape cartridge could be mounted into. The available tape drives may include initially selected tape drive 20c. Proxy agent 16 then selects a tape drive for processing the second desired tape cartridge. Proxy agent 16, as an example, selects tape drive 20b as the second selected tape drive. In response, library server 14 directs the robot assembly to retrieve the second desired tape cartridge from its storage location and mount it into second selected tape drive 20b. Library server 14 then directs the robot assembly to dismount the tape cartridge from initially selected tape drive 20c and return it back into its storage location.

Preferably, the tape drives selected subsequently to a previously selected tape drive are different so that dismounting and returning previously desired tape cartridges from a previously selected tape drive can be performed by the robot assembly while the currently desired tape cartridge is being accessed in another tape drive. This saves time as compared to the robot assembly dismounting a tape cartridge from a tape drive and then mounting a second tape cartridge into the same tape drive.

Proxy agent 16 then directs access controller 22 to enable the data path between host computer 12a and second selected tape drive 20b via virtual tape drive 24a. Host computer 12a then has access to the second desired tape cartridge mounted in second selected tape drive 20b to process the second desired tape cartridge. The process then continues until host computer 12a is done processing tape cartridges.

While access controller 22 enables host computer 12a to access a desired tape cartridge in a selected tape drive through virtual tape drive 24a, other host computers 12 can simultaneously access other tape cartridges in other tape drives through respective virtual tape drives 24. For instance, while host computer 12a is accessing a first tape cartridge in tape drive 20c host computer 12b sends a control signal to library server 14 requesting the library server to retrieve a second tape cartridge from tape library 18 and mount it into virtual tape drive 24b. Proxy agent 16 intercepts the control signal from host computer 12b and queries library server 14 to generate a list of available tape drives that the second tape cartridge could be mounted into. Proxy agent 16 then selects a tape drive such as tape drive 20a for processing the second tape cartridge. In response, library server 14 directs the robot assembly to retrieve the second tape cartridge from its storage location and mount it into tape drive 20a. Proxy agent 16 then directs access controller 22 to enable the data path between host computer 12b and tape drive 20a via virtual tape drive 24b. Host computer 12b then has access to the second tape cartridge mounted in tape drive 20a while host computer 12a has access to the first tape cartridge mounted in tape drive 20c.

Figure 2:
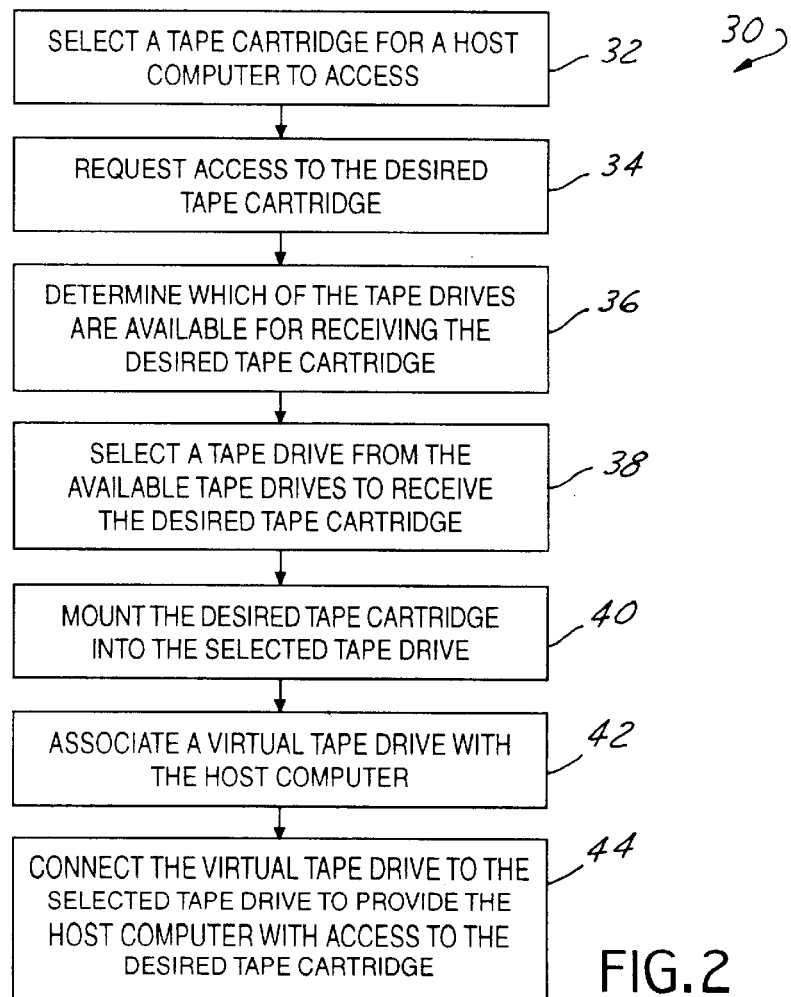
FIG. 2 illustrates a flow chart describing operation of the method and system of the present invention.

Referring now to FIG. 2, with continual reference to FIG. 1, a flow chart 30 showing operation of the method and system for connecting a host computer such as host computer 12a to a tape drive for accessing a tape cartridge in accordance with the present invention is illustrated. Initially, host computer 12a selects a tape cartridge stored in tape library 18 for host computer 12a to access as shown in block 32. Host computer 12a then requests library server 14 for the host computer to have access to the desired tape cartridge as shown in block 34. Proxy agent 16 then determines which of the tape drives in tape library 18 are available for receiving the desired tape cartridge as shown in block 36. Proxy agent 16 then selects a tape drive such as tape drive 20c from the available tape drives to receive the desired tape cartridge as shown in block 38. Proxy agent 16 may select the tape drive as a function of the proximity of the location of the tape drive with respect to the storage location of the desired tape cartridge.

In response, library server 14 retrieves the desired tape cartridge and mounts it into the selected tape drive as shown in block 40. If the desired tape cartridge is not mounted properly in the selected tape drive, then proxy agent 16 selects another tape drive such as tape drive 20n to receive the desired tape cartridge. If the desired tape cartridge is mounted properly into the selected tape drive, access controller 22 then provides a virtual tape drive 24a associated with host computer 12a as shown in block 42. Access controller 22 then connects virtual tape drive 24a to selected tape drive 20c to provide host computer 12a with access to the desired tape cartridge as shown in block 44.

Figure 3:
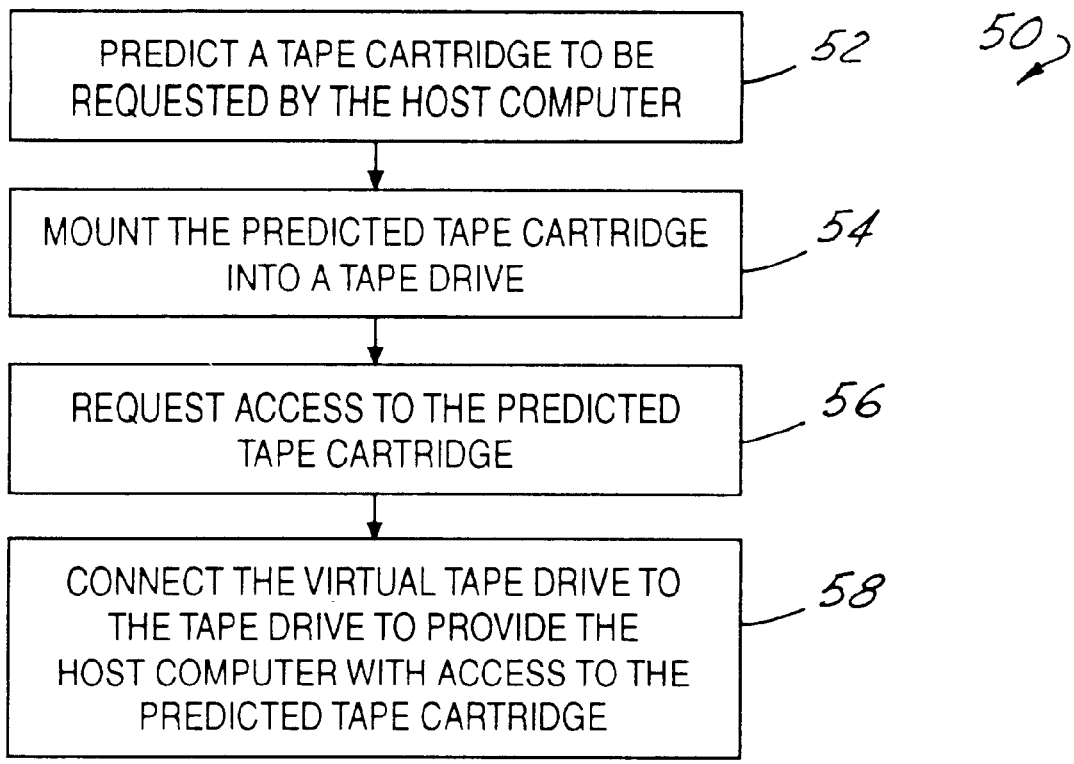
FIG. 3 illustrates a flow chart further describing operation of the method and system of the present invention.

Referring now to FIG. 3, with continual reference to FIGS. 1–2, a second flow chart 50 describing further operation of the method and system of the present invention is illustrated. Initially, a tape cartridge stored in the tape library to be requested by host computer 12a to access is predicted prior to host computer 12a requesting access to the tape cartridge as shown in block 52. The predicted tape cartridge may be a scratch tape cartridge so that when a mount scratch is received, the predicted tape cartridge can be made immediately available. To this end, library server 14 mounts the predicted tape cartridge into a tape drive such as tape drive 20b as shown in block 54. Host computer 12a then requests library server 14 for access to the predicted tape cartridge after the predicted tape cartridge has been mounted into tape drive 20b as shown in block 56. Access controller 22 then connects virtual tape drive 24a to tape drive 20b having the predicted tape cartridge to provide host computer 12a with access to the predicted tape cartridge as shown in block 58.

In summary, the present invention includes a proxy agent that is in control of selecting a tape drive from a plurality of tape drives. The tape drive selected for a particular request may be different with each successive mount. The virtualization allows the proxy agent to select an appropriate tape drive, from any number of criteria, without requiring host computer reconfiguration.

Thus it is apparent that there has been provided, in accordance with the present invention, a method and system for dynamically selecting tape drives to connect with host computers that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A data storage system comprising:

a plurality of host computers;

a library having a plurality of storage units and a plurality of physical drives for processing the plurality of storage units, the library further having a library server operable to mount the plurality of storage units into the plurality of physical drives; and a controller having a plurality of virtual drives each associated with a respective one of the plurality of host computers, the controller operable to receive a request from a host computer for access to a desired storage unit, select a physical drive to receive the desired storage unit, direct the library server to mount the desired storage unit into the selected physical drive, and connect the virtual drive to the selected physical drive to provide the host computer with access to the desired storage unit through the virtual drive, the virtual drive presenting the host computer with a perspective that the host computer is connected to a dedicated tape drive not shared with any other host computer in the plurality of host computers.

2. The system of claim 1 wherein:
the controller is further operable to determine proximity information of the desired storage unit with respect to each one of the plurality of physical drives, wherein the controller selects a physical drive from the plurality of physical drives based on the proximity information.

3. The system of claim 1 wherein:
the controller is further operable to determine which of the plurality of physical drives are available for receiving the desired storage unit, wherein the controller selects a physical drive from the plurality of available physical drives.

4. The system of claim 1 wherein:
the controller is further operable to predict a storage unit stored in the library to be requested by the host computer to access, mount the predicted storage unit into a physical drive, request the library server for the host computer to have access to the predicted storage unit after the predicted storage unit has been mounted into the physical device, and connect the virtual drive to the physical drive having the predicted storage unit to provide the host computer with access to the predicted storage unit.

5. The system of claim 1 wherein:
the controller is further operable to receive a request from a second host computer for access to a second storage unit, select a second physical drive from the plurality of physical drives to receive the second storage unit, direct the library server to mount the second storage unit into the selected second physical drive, and connect the virtual drive associated with the second host computer to the selected second physical drive to provide the second host computer with access to the second storage unit.

6. The system of claim 1 wherein:
the storage units are tape cartridges, the physical drives are tape drives, and the virtual drives are virtual tape drives.

7. The system of claim 1 wherein:
the storage units are disks, the physical drives are disk drives, and the virtual drives are virtual disk drives.

8. In a data storage system having a library provided with a plurality of storage units, a plurality of physical drives for processing the storage units, and a library server for mounting the plurality of storage units into the plurality of physical drives, a method for connecting one of a plurality of host computers to a physical drive for accessing a storage unit, the method comprising:

connecting each of the plurality of host computers to an access controller;

connecting each of the plurality of physical drives to the access controller;

establishing at least one virtual drive in the access controller for each of the plurality of host computers;

receiving a request to access a particular storage unit, the request initiated by a requesting host computer, the requesting host computer one of the plurality of host computers;

mounting the particular storage unit into a determined physical drive using the library server; and forming a connection in the access controller between one of the at least one virtual tape drives established for the requesting host computer and the determined physical drive, the connection formed in the access controller carrying data between the requesting host computer and the determined physical drive.

9. In a data storage system having a library provided with a plurality of storage units, a plurality of physical drives for processing the storage units, and a library server for mounting the plurality of storage units into the plurality of physical drives, a method for connecting a host computer to a physical drive for accessing a storage unit, the method comprising:

selecting a desired storage unit stored in the library for a host computer to access;

requesting the library server for the host computer to have access to the desired storage unit;

selecting a physical drive from the plurality of physical drives to receive the desired storage unit;

mounting the desired storage unit into the selected physical drive using the library server;

providing a virtual drive associated with the host computer the virtual drive connected to the associated host computer, the virtual drive giving the host computer a perspective that the host computer is connected to a dedicated tape drive not shared with any other host computer;

connecting the virtual drive to the selected physical drive to provide the host computer with access to the desired storage unit; and passing data between the host computer and the desired storage unit through the virtual drive.

10. The method of claim 9 further comprising:
determining proximity information of the desired storage unit with respect to each one of the plurality of physical drives, wherein selecting a physical drive from the plurality of physical drives is based on the proximity information.

11. The method of claim 9 further comprising:
determining which of the plurality of physical drives are available for receiving the desired storage unit, wherein selecting a physical drive from the plurality of physical drives includes selecting the physical drive from the available physical drives.

12. The method of claim 9 further comprising:
predicting a storage unit stored in the library to be requested by the host computer to access;

mounting the predicted storage unit into a physical drive;

requesting the library server for the host computer to have access to the predicted storage unit after the predicted storage unit has been mounted into the physical device; and connecting the virtual drive to the physical drive having the predicted storage unit to provide the host computer with access to the predicted storage unit.

13. The method of claim 9 further comprising:

selecting a second storage unit stored in the library for a second host computer to access;

requesting the library server for the second host computer to have access to the second storage unit;

selecting a second physical drive from the plurality of physical drives to receive the second storage unit;

mounting the second storage unit into the selected second physical drive using the library server;

providing a second virtual drive associated with the second host computer; and connecting the second virtual drive to the selected second physical drive to provide the second host computer with access to the second storage unit.

14. The method of claim 9 wherein:

the storage units are tape cartridges, the physical drives are tape drives, and the virtual drives are virtual tape drives.

15. The method of claim 9 wherein:

the storage units are disks, the physical drives are disk drives, and the virtual drives are virtual disk drives.

16. In a data storage system having a library provided with a plurality of tape cartridges, a plurality of tape drives for processing the tape cartridges, and a library server for mounting the plurality of tape cartridges into the plurality of tape drives, a method for connecting a host computer to a tape drive for accessing a tape cartridge, the method comprising:

selecting a desired tape cartridge stored in the library for a host computer to access;

requesting the library server for the host computer to have access to the desired tape cartridge;

determining which of the plurality of tape drives are available for receiving the desired tape cartridge;

selecting a tape drive from the available tape drives to receive the desired tape cartridge;

mounting the desired tape cartridge into the selected tape drive using the library server;

providing a virtual tape drive connected to the host computer, the virtual tape drive giving the host computer a perspective that the host computer is connected to a dedicated tape drive not shared with any other host computer; and connecting the virtual tape drive associated with the host computer to the selected tape drive having the desired tape cartridge to provide the host computer with access to the desired tape cartridges;

thereby providing a data path between the host computer and the selected tape drive through the virtual tape drive.

17. The method of claim 16 further comprising:

determining proximity information of the desired tape cartridge with respect to the available tape drives, wherein selecting a tape drive from the available tape drives is based on the proximity information.

18. The method of claim 16 further comprising:

predicting a storage unit stored in the library to be requested by the host computer to access;

mounting the predicted storage unit into a physical drive;

requesting the library server for the host computer to have access to the predicted storage unit after the predicted storage unit has been mounted into the physical device; and connecting the virtual drive to the physical drive having the predicted storage unit to provide the host computer with access to the predicted storage unit.

19. The method of claim 16 further comprising:

selecting a second storage unit stored in the library for a second host computer to access;

requesting the library server for the second host computer to have access to the second storage unit;

selecting a second physical drive from the plurality of physical drives to receive the second storage unit;

mounting the second storage unit into the selected second physical drive using the library server;

providing a second virtual drive associated with the second host computer; and connecting the second virtual drive to the selected second physical drive to provide the second host computer with access to the second storage unit.

* * * * *

UNITED STATES PATENT AND TRADEMARK OFFICE
CERTIFICATE OF CORRECTION

PATENT NO.        : 6,842,841 B1
APPLICATION NO. : 09/400500
DATED             : January 11, 2005
INVENTOR(S)       : Timothy John Kuik et al.

It is certified that error appears in the above-identified patent and that said Letters Patent is hereby corrected as shown below:

Cover page, section (75), add inventor -- ; Anthony W. Steere Jr., Superior, CO (US) --

Signed and Sealed this

First Day of July, 2008

JON W. DUDAS
*Director of the United States Patent and Trademark Office*